(12) United States Patent
Chau

(10) Patent No.: US 7,677,453 B2
(45) Date of Patent: Mar. 16, 2010

(54) SYSTEM AND METHOD FOR PURCHASING GAME AND LOTTERY TICKETS

(76) Inventor: Wayne P. Chau, P.O. Box 3898, Hoboken, NJ (US) 10185

( * ) Notice: Subject to any disclaimer, the term of this patent is extended or adjusted under 35 U.S.C. 154(b) by 853 days.

(21) Appl. No.: 11/339,477

(22) Filed: Jan. 26, 2006

(65) Prior Publication Data
US 2006/0122910 A1     Jun. 8, 2006

Related U.S. Application Data

(62) Division of application No. 10/405,235, filed on Apr. 3, 2003, now Pat. No. 7,024,375.

(60) Provisional application No. 60/388,733, filed on Jun. 17, 2002.

(51) Int. Cl.
*G06K 7/06* (2006.01)
*G07G 5/00* (2006.01)

(52) U.S. Cl. .................. 235/443; 705/24; 705/27

(58) Field of Classification Search .............. 705/26, 705/24, 27; 235/375, 383, 443
See application file for complete search history.

(56) References Cited

U.S. PATENT DOCUMENTS

| | | | |
|---|---|---|---|
| 4,982,337 A * | 1/1991 | Burr et al. .............. 700/235 |
| 5,703,949 A | 12/1997 | Rosen | |
| 5,772,511 A | 6/1998 | Smeltzer | |
| 5,921,865 A | 7/1999 | Scagnelli et al. | |
| 5,935,000 A | 8/1999 | Sanchez et al. | |
| 6,012,984 A | 1/2000 | Roseman | |
| 6,024,641 A | 2/2000 | Sarno | |
| 6,277,026 B1 | 8/2001 | Archer | |
| 6,322,446 B1 | 11/2001 | Yacenda | |
| 6,383,078 B1 | 5/2002 | Yacenda | |
| 6,527,638 B1 | 3/2003 | Walker et al. | |
| 6,571,216 B1 | 5/2003 | Garg et al. | |
| 6,572,106 B2 | 6/2003 | Alexoff | |
| 6,663,105 B1 | 12/2003 | Sullivan et al. | |
| 6,677,858 B1 | 1/2004 | Faris et al. | |
| 6,735,324 B1 | 5/2004 | McKinley et al. | |
| 7,024,375 B2 | 4/2006 | Chau et al. | |
| 2003/0023547 A1 | 1/2003 | France et al. | |

OTHER PUBLICATIONS

"Claiming Prizes"; Game Specifics, © 2004 California Lottery.
"About the Lottery—Frequent Questions" Game Information, © 2004 Virginia Lottery.
"Rules and Regulations", How to Play, 2003 Annual Report Snapshot for Maryland Lottery.

(Continued)

*Primary Examiner*—Andrew Joseph Rudy
(74) *Attorney, Agent, or Firm*—Nixon & Vanderhye, PC

(57) ABSTRACT

A system and method for buying tickets for games or lotteries in which a seller receives predicted game or lottery outcome data communicated from a buyer over a communication path. The seller generates a printed ticket based on the received outcome data and the seller transfers the printed ticket to a custodian that holds the printed ticket on behalf of the buyer. The custodian transmits data relating to the printed ticket to the buyer over the communication path and notifies the buyer if the printed ticket corresponds to an actual game or lottery outcome.

9 Claims, 7 Drawing Sheets

OTHER PUBLICATIONS

"Ask New York Lottery—Frequently Asked Questions" Game Information, © 2003 New York Lottery.

"Big Game Mega Millions Lottery News" BigGameLottery.com, © 1999-2004 Big Game LLC.

"Play Powerball Online at PlayLot.com", Playlot.com, © 2004 Niles International Inc.

"Frequently Asked Questions", PlayLot.com, © 2004 Niles International Inc.

"How to Play USA Powerball", Lotto American Powerball, © 1995-2004 Lottoshop.com.

USA Powerball Information:, Lotto American Powerball, © 1995-2004 Lottoshop.com.

"USA Powerball—Frequently Asked Questions", Lotto American Powerball, © 1995-2004 Lottoshop.com.

"About Overseas Subscribers Agents (OSA)", Lotto American Powerball, © 1995-2004 Lottoshop.com.

"Welcome to Lottery Universe", Lottery Universe, © 2000-2004 Lottery Universe.

"Lottery Universe—Your Information is SAFE with us", Lottery Universe, © 2000-2004 Lottery Universe.

"22,000 customers can't be wrong", Lottery Universe, © 2000-2004 Lottery Universe.

"100% of the winnings are yours", Lottery Universe, © 2000-2004 Lottery Universe.

White, Ron, How Computers Work, Millenium Ed. Que Corporation, Sep. 1999.

Derfler, Frank J. et al., How Networks Work, Millenium Ed., Que Corporation, Jan. 2000.

Gralla, Preston, How the Internet Works, Millenium Ed., Que Corporation, Aug. 1999.

Letter dated Oct. 2000 from Bernard Kerry to Valerie Murray.

"We don't charge you a % of your winnings—FAQ", Lottery Universe.

"Lottery Results", theLotter.com, © The Lotter Limited 1999-2004.

"Lotto Online Service", lottoonlineservice.com, © 1999-2001 Lotto Online Service.com.

"Lotto Jackpot", lottoonlineservice.com, © 1999 Lotto Online Service.

"Rules & FAQ", lottoonlineservice.com, © 1999 Lotto Online Service.

* cited by examiner

Play and Purchase

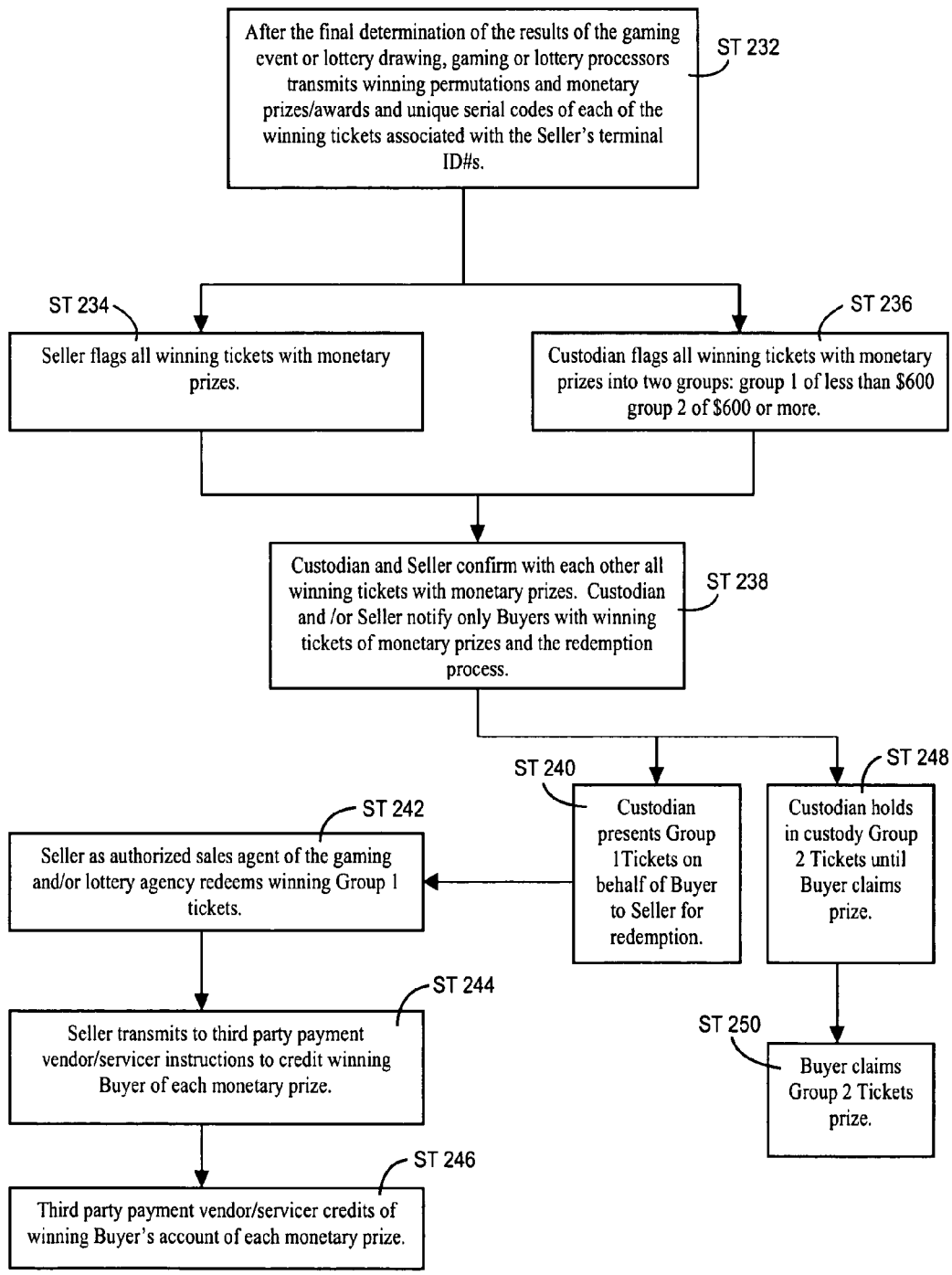

Bricks - Play and Purchase

Bricks - Redemption

Sticks

SYSTEM AND METHOD FOR PURCHASING GAME AND LOTTERY TICKETS

RELATED APPLICATION

This application is a divisional of application Ser. No. 10/405,235, filed Apr. 3, 2003, now U.S. Pat. No. 7,024,375 which claims the benefit of U.S. Provisional Application No. 60/388,733, filed Jun. 17, 2002, the contents of which are incorporated herein in their entirety.

TECHNICAL FIELD

The present invention generally relates to systems and methods for purchasing tickets and, more particularly, to such systems and methods involving the use of a trusted third party intermediary (custodian). Even more specifically, the present invention relates to a system and method for wagering on the outcomes of gaming events or playing lottery games by perfecting the buyer's security interest to the physical/bearer game tickets generated by an; authorized sales agent of a gaming or lottery agency.

BACKGROUND AND SUMMARY

Traditionally, when wagering on the outcome of gaming events or playing lottery games, a buyer must go to the gaming agency itself (such as a race track) or to a governmentally authorized site (such as OTB aka Off Track Betting) or to a lottery retailer. The buyer completes a game card or communicates to the sales agent the (alpha) numeric sequence(s) he or she wishes to play, and pays the sales agent the wager. The sales agent enters the selections into either an on-site or on-line terminal that is connected to the gaming or lottery's processing system. The chosen (alpha) numeric sequence is recorded, and then a coded physical/bearer claim ticket with the details of the (alpha) numeric sequence is instantaneously issued and printed. The physical/bearer ticket is handed over to the buyer, and the buyer takes possession of the ticket. The gaming or lottery agency recognizes the actual physical/bearer ticket as the sole form of legal claim to any winnings or prizes, with one exception.

The exception is when the buyer enters into a subscription arrangement with a lottery agency in which the buyer subscribes to the same (alpha) numeric sequence for a fixed number of future drawings. In this instance, the buyer must complete an application form detailing personal information and submit the application and payment to the agency. The lottery agency records the subscription into its system and issues an official acknowledgement to the subscriber of the (alpha) numeric sequence, the subscription period and number of future drawings. The personal information is recorded in the lottery agency's database.

The subscription agreement is the sole exception where a gaming or lottery agency does not issue a physical ticket, but has a recognized potential legal claim. However, the subscription process generates very low sales volume for the sponsors because of the inconvenience of the enrollment process and the lack of flexibility offered to the buyer.

At present, numerous Internet sites offer wagering through virtual casinos, private or offshore lottery drawings and interactive games. However, in the United States, no federal, state or local government or agency has offered wagering, gaming or playing the lottery via the Internet. One reason for this is that changing the current bearer ticket environment into a bearer ticket and ticket-less environment requires a major process change, and a major systems rewrite ("process" change). Another reason is that a widespread ticket-less process invites significant fraud, legal and logistical exposure ("risk" change) to the sponsoring entity. Many proposals have been made regarding new systems and methods that require the sponsoring entity to adopt a major "process" and/or "risk" change to accommodate the Internet as a distribution channel. To date, in the United States, no federal, state or local government or agency has adopted or embraced any change for its gaming or lottery system from the current physical/bearer ticket process (excluding subscriptions), which by its very nature is Internet unfriendly.

The example system and method described herein do not require the sponsoring entity to adopt a major "process" and/or "risk" change to accommodate the Internet as a distribution channel. The government's (and/or its agent's) interest is satisfied while a buyer's legal claim to physical/bearer tickets for transactions initiated over the Internet is safeguarded. In the disclosed example system and method, the actual physical/bearer ticket is in the physical possession of a custodian/safekeeper, and the custodian/safekeeper maintains custody of the ticket on behalf of the buyer. The introduction of an independent third party custodian/safekeeper to hold in custody the physical bearer ticket avoids potential conflicts of interest between buyer and seller, and remedies the risk concerns of the governmental sponsors.

An example system and method are described below which facilitate a buyer's perfection of his/her/their security interest to physical/bearer game tickets, purchased and issued from a seller (e.g., an authorized sales agent of a gaming and/or lottery agency) through the use of an independent custodian. This makes the purchase of gaming and lottery tickets viable when and where the initiation of the transaction is over a communication path like the Internet. No substantial modification to the present gaming or lottery systems that issue physical bearer tickets is required—the system and method described herein may be provided as an add-on to existing gaming or lottery systems.

The example security interest perfection system and method described herein includes three aspects: a communication network, a physical back office operation, and contractual custodial/safekeeping agreements. This is referred to herein as the "clicks," "bricks" and "sticks" framework. The first framework is systems or "clicks" and encompasses an open-ended architecture for a plurality of buyers using the Internet to purchase gaming or lottery tickets and to receive confirmation of such purchases; their Internet Service Provider; and a designated sales agent system which includes web servers, firewalls, security, authentication and authorization systems, and host machines structured in a distributed computing environment. The second framework is a physical processing mechanism or "bricks" in which on line gaming and/or lottery systems generate actual physical/bearer tickets and are safekept, and where all relevant information of those tickets are imaged and recorded. The third framework is the execution by the buyer, sales agent and/or custodian/safekeeper of a roles and responsibility agreement. "Sticks" refers to a legal agreement executed on line that delineates a legal and contractual engagement of an independent third party (e.g., the custodian/safekeeper) thereby clearly segregating the interest of the buyer and seller.

These and other features and advantages of the present invention will become apparent from the following detailed description of illustrative embodiments, which is to be read in connection with the accompanying drawings.

BRIEF DESCRIPTION OF THE DRAWINGS

FIGS. 3A and 3B are flow charts of processes carried out in the system of FIG. 2;

DETAILED DESCRIPTION

The various illustrative embodiments described below relate to a system and method for enabling a buyer to perfect his/her/their security interest to physical/bearer game tickets purchased over a communication network and issued from an authorized sales agent of a gaming and/or lottery agency. In certain particular illustrative embodiments, the system and method enable the perfection of a security interest to physical/bearer game tickets in which the purchase transaction is initiated on the Internet or World Wide Web. "Buyer" as used herein may refer to an individual or to a group of individuals. That is, a group of individuals may arrange to purchase one or more tickets using the system and method described herein.

Figure 1:
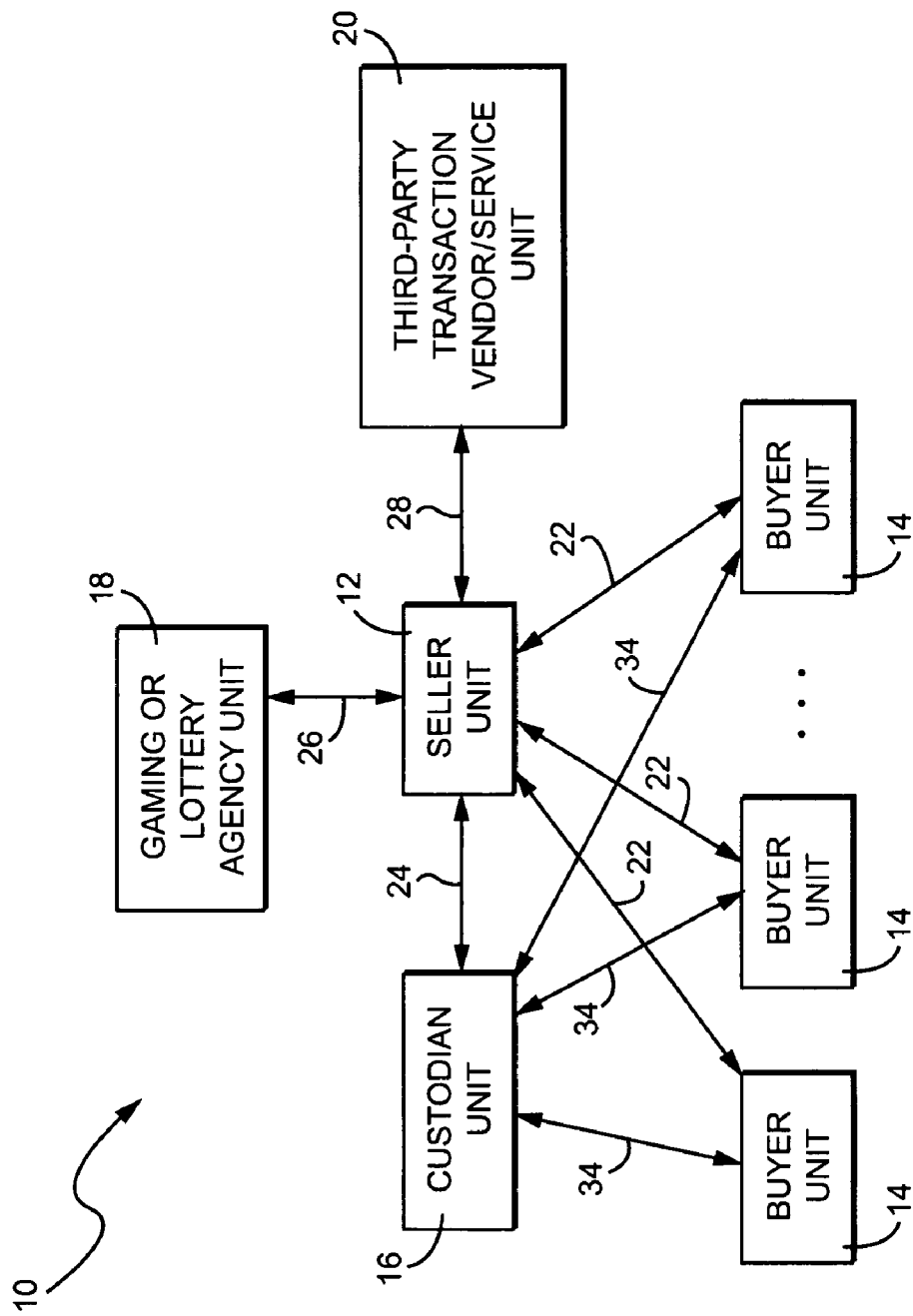
FIG. 1 is a generalized block diagram of a system 10 in accordance with an illustrative embodiment.

FIG. 1 is a generalized block diagram of an overall system 10 that includes at least one seller unit 12, a plurality of buyer units 14, a custodian unit 16, a gaming or lottery agency unit 18, and a third-party transaction vendor/servicer unit 20. The seller unit 12, the custodian unit 16, the gaming or lottery agency unit 18 and the third-party transaction vendor/servicer unit 20 may be located at different, remotely located facilities and operated by respective operators. Of course, one or more of these units may be located at the same facility and operated by the same operator. For example, the seller unit 12 and the custodian unit 16 may be located at the same facility and operated either by the same operator or by operators of their respective organizations.

Various communication paths enable communication among these system units. For example, communication paths 22 enable communication between seller unit 12 and buyer unit 14; a communication path 24 enables communication between seller unit 12 and custodian unit 16; a communication path 26 enables communication between seller unit 12 and gaming or lottery agency unit 18; a communication path 28 enables communication between seller unit 12 and third party vendor/servicer unit 20; and communication paths 34 enable communication between custodian unit 16 and buyer units 14. The communication paths 22, 24, 26, 28 and 34 may be wired or wireless paths and may each be comprised of dedicated (point-to-point) paths and/or networks such as local area networks (LANs), metropolitan area networks (MANs), wide area networks (WANs), and the like. Although shown in FIG. 1 as being separate, some of the communication paths may be the same or may include common portions. For example, all the communication paths could pass through a common network such as the Internet.

The buyer units 14 are typically located at geographically remote locations with respect to each other and are connected for two-way communication with the seller unit 12 over the communication paths 22. To enable communication over paths 22, the seller unit(s) 12 and buyer units 14 include (or are connected to) communication circuitry such as modems, network adapters and the like. In one illustrative embodiment, the seller and buyer units 12, 14 comprise respective computer systems coupled for communication over the Internet or World Wide Web. The seller unit 12 communicates with gaming or lottery agency unit 18 to generate the physical/bearer tickets as detailed in a purchase transaction. The seller unit 12 communicates with custodian/safekeeper unit 16 to process and hold in custody the physical/bearer ticket(s). Seller unit 12 transmits to any of the relevant parties to the transaction all pertinent physical/bearer ticket data for identification including tracking data, prize awards and seller data. The seller unit 12 communicates with third party transaction vendor/servicer unit 20 for the assessment and processing of payment by a buyer to the seller for desired purchase transactions. The seller unit 12 also communicates with third party vendor/servicer unit 20 to credit to the buyer monetary prizes in compliance with conditions promulgated by regulatory agencies. The seller unit 12 communicates to the buyer units 14 any special handling or claims administration processes to monetary prizes in compliance with procedures, rules and regulations promulgated by the regulatory agencies.

The custodian/safekeeper unit 16 receives transmissions from seller unit 12 and/or gaming or lottery agency unit 18 which include purchase data associated with each physical/bearer ticket produced. Limitations may be imposed by regulatory agencies on the communication paths that may connect to the gaming or lottery agency unit 18. In such cases, a direct communication link between the gaming or lottery agency unit 18 and the custodian/safekeeper unit 16 may not be permitted. If the gaming/lottery agency permits only a communication path to the seller unit 12, then the seller unit 12 relays any purchase information derived from the gaming or lottery agency unit 18 to the custodian unit 16. The purchase data may, for example, include tracking data for each ticket. This tracking data may include, but is not limited to, a unique serial code for the ticket, an identifier (ID) identifying the seller of the ticket and an identifier of the terminal of the seller that printed the ticket. Of course, any other data or codes that are required or determined to be relevant by the gaming or lottery agency and/or the custodian/safekeeper for the identification of a legal claim to winning prizes or for tracking purposes may be stored. The custodian/safekeeper unit 16 communicates to the buyer units 14 confirmation of the purchase of tickets, which may include tracking data and/or images of physical/bearer tickets held in custody on behalf of buyer. If applicable, the custodian/safekeeper unit 16 also communicates data regarding prize winnings and the credit of these winnings to the buyer's account (e.g., credit card, bank account, etc.) or the appropriate methodologies for claiming such prizes.

If the communication path 26 between the gaming or lottery agency unit 18 and the seller unit 12 can not be established, the purchase or tracking data, which may include, but is not limited to, a unique serial code for the ticket, and identifier (ID) identifying the seller of the ticket and an identifier of the terminal of the seller that printed the ticket, or any other data or codes that are required or determined to be relevant by the gaming or lottery agency and/or the custodian/safekeeper for the identification of a legal claim to winning prizes or for tracking purposes, can be obtained directly from the actual physical ticket through data and image recognition technology employed by the seller unit 12 and/or the custodian/safekeeper unit 16. The custodian/safekeeper unit 16 communicates to the buyer units 14 confirmation of the purchase of tickets, which may include tracking data and/or images of physical/bearer tickets held in custody on behalf of buyer.

The physical/bearer tickets produced by the seller unit 12 are physically transferred to a reader/sorter of the custodian unit 16, which images the tickets and stores these images in a database along with corresponding tracking data. The physical tickets are then stored at the custodian facility. The ticket images and/or tracking data are transmitted to the buyer unit from which the ticket was purchased and, if desired, to seller unit 12 for storage in a database thereof. The reader/sorter of the custodian/safekeeper unit 16 preferably includes the ability to recognize on a dynamic basis any data string printed on the physical/bearer ticket and the recognition of these data strings is preferably not restricted to any predefined fields. Data string recognition processes facilitate ticket image retrieval and determination of the tracking data. The custodian/safekeeper unit 16 also bundles the physical/bearer tickets, codes the bundles and safekeeps the coded bundles in coded cells at a secure location (e.g., a vault) of the custodian's facility. The bundling, coding and transport to the secure location may be performed automatically or manually. All relevant information regarding the bundling, coding and storage location is recorded and stored at the custodian/safekeeper unit 16 and may, if desired, be transmitted to the seller unit 12 and the buyer unit from which the ticket was purchased.

The seller unit 12 is capable of providing to the buyer units 14 information and contractual agreements including, but not limited to, custodial/safekeeping agreements and of receiving and storing custodial/safekeeping agreements executed by the buyers. The buyer unit's access to seller unit 12 is controlled, based on the buyer's execution of custodial/safekeeping agreement and on the buyer's level of engagement to consummate a purchase transaction. Confirmation of an executed custodial/safekeeping agreement and a consummated purchase transaction between and amongst all relevant parties is communicated by the seller and/or custodian unit to the buyer unit along with an electronic image of the bearer ticket(s) printed as a result of the transaction.

Significant levels of system firewalls and authentication processes are used to screen and to prevent unauthorized access to seller unit 12. Authentication processes are used to validate the identity of the seller unit to the buyer.

The outcome data for the game or lottery entered by the buyer is communicated to a seller unit ticket machine which is linked and communicates with the gaming or lottery agency unit 18. The seller unit ticket machine is typically located at the site of a trusted third party such as a bank, a financial institution or other party with 24/7 secured facilities. The seller unit ticket machine is provided with an interface for communication within other processors and databases of the seller unit 12. If such communication involves the Internet, a server may be provided for the Internet access by the seller unit and this server may provide the purchase information to the ticket machine. The server functionality may be provided via stand-alone equipment or this functionality may be built into the ticket machine.

The outcome data supplied to the seller unit ticket machine from other processors of seller unit 12 is used to generate printed tickets. The seller unit ticket machine actually generates printed tickets and the buyer is provided with an electronic receipt of his/her/their purchase. The printed tickets are maintained in the custody of the trusted third party ("custodian/safekeeper") and a tracking mechanism is provided to track the printed tickets. For example, the printed tickets may be optically scanned and images of the scanned tickets may be stored along with relevant purchase data (e.g., tracking data; name of buyer; buyer contact information such as mailing address, e-mail address, and/or telephone number; time of purchase; etc.) A database of the custodian/safekeeper unit 16 stores data that records the user's purchases.

The purchase data, along with information regarding winnings, losses, etc., may be maintained in the database of the custodian/safekeeper unit 16 and access to the database may be provided to the buyers. For example, the purchase data may be accessible via the Internet and the buyer provided with a spreadsheet-like presentation showing purchase data for some period of time. Access to such data may be limited, for example, by requiring entry of an appropriate password or some other technique for verifying the identity of the person accessing the data.

The amount of the purchase and/or any winnings may be deducted from and/or added to an account of the buyer (such as a bank account, credit card or debit card) by third party transaction vendor/servicer unit 20. Of course, the use of a third party transaction vendor/servicer unit is not required. For example, the buyer may set up an account with the seller or the custodian and the purchase and/or winning amounts may be credited to and deducted from such an account. In still another contemplated implementation, the ticket buyer may purchase cards similar to calling cards, which provide the buyer with a certain amount ($5, $10, $50, etc.) of credit that may be used to purchase tickets. These cards may, for example, include a magnetic strip that is activated at the time of purchase and is readable by the buyer unit used by the buyer. Alternatively, the cards may include a number that is entered by the user to permit charges to be incurred against the pre-paid amount.

The seller unit 12 and/or custodian/safekeeper unit 16 may be updated with actual outcome data such as winning lottery numbers, winning horses, winning jai alai players, etc. This outcome data may be used to automatically generate an electronic communication to the buyer using, for example, contact information provided by the buyer. The communication may, for example, take the form of an e-mail communication that includes the outcome data and how the buyer fared (e.g., how much won or lost, etc.). The seller unit 12 and/or custodian/safekeeper unit 16 may also be configured to telephone winners to inform them of their winnings. The communication to the buyer may prompt the buyer for a response. For example, the buyer may be asked whether he/she wishes the custodian to store losing printed tickets for some period of time (e.g., for tax purposes) or simply destroy them.

Figure 2:
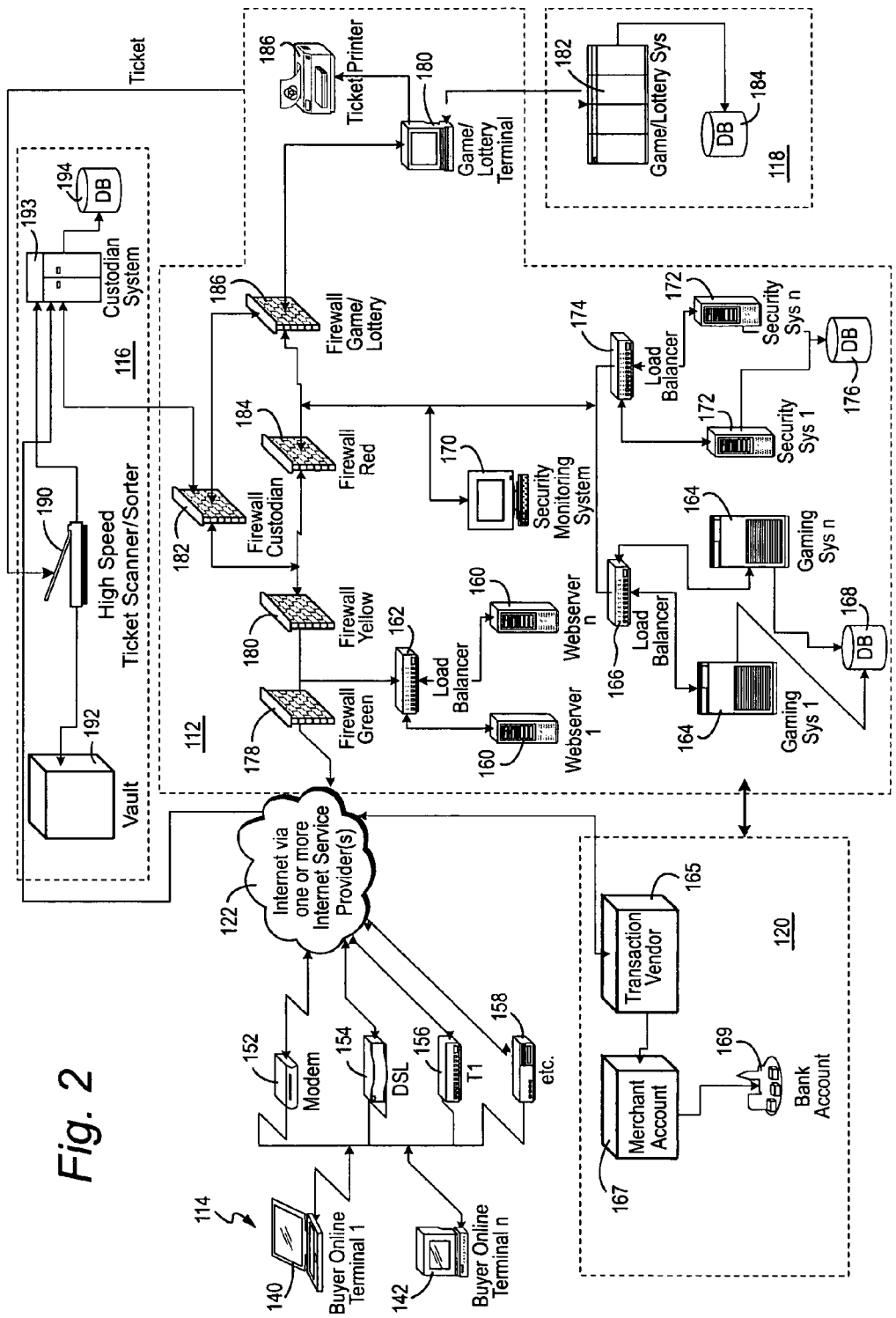
FIG. 2 is a block diagram of an example embodiment of the system shown in FIG. 1.

FIG. 2 is a block diagram of an example implementation of the system shown in FIG. 1. As shown in FIG. 2, buyer units 114 may include laptop computers 140 and personal computers 142. Of course, other types of buyer units may also be utilized within the system and method described herein. For example, the buyer units may be kiosks located at public facilities such as malls, airports, etc.; hand-held wireless devices such as personal digital assistants (PDAs) or wireless telephones; or any other device capable of selecting outcomes of gaming or lottery events, entering relevant personal information, payment formats and receiving communications from seller unit 112. Buyer units 114 connect to a communication path 122 via a communication circuit such as a modem 152, a DSL connection 154, a T1 connection 156 or some other type of network connection 158. Buyers use buyer units 114 to connect through the communication path 122 to seller unit 112 (in particular, a web site maintained by seller unit 112). Communication path 122 is typically the Internet, but may of course be any type of wired or wireless communication path. The buyer unit provides an interface usable to effect purchases of bearer tickets. The particulars of the interface will depend at least on part on the type of buyer unit. For example, the interface provided for a PDA or wireless telephone may be different than the interface provided for a personal or notebook computer in consideration of the different screen sizes and input devices typically associated with these devices.

Seller unit 112 includes one or more web servers 160 whose loads are balanced by a load balancer 162. Seller unit 112 also includes one or more gaming system computers 164 whose loads are balanced by a load balancer 166. A database 168 is accessible by the gaming system computers 164. Web servers 160, a security monitoring system computer 170, one or more security system computers 172, a load balancer 174 for balancing the load of the security system computers, a database 176 accessible by the security system computers 172, and an arrangement of firewalls 178, 180, 182, 184, and 186 provide security for seller unit 112.

The web servers 160 provide security in a couple of ways. First, they encrypt data transmissions. They also perform cyclical redundancy checking (CRC) on the data transmissions. CRC verifies that the data transmissions are not altered in any way—inadvertently or on purpose. Web servers 160 also provide a mechanism that allows authentication of the web servers 160 so that components communicating with the servers know the web servers 160 are who they claim to be. The security monitoring system computer 170 provides an administrative interface to the security software installed in seller unit 112. Security monitoring systems computer functionality can be distributed to other computer platforms or placed on standalone platforms as shown in this diagram. Typical security software verifies the operating system's security settings or performs real-time monitoring of an operating system's security settings.

The security system computers 172 provide an authentication mechanism that lets buyers connect to the gaming system computer(s) 164. By way of example, the authentication method could consist of user name/password combinations, biometrics, physical tokens (like SecureID cards), etc. The security system computers 172 also provide a method to place users of the seller unit 112 into predetermined logical groups. This grouping mechanism allows the segregation of users by predetermined functions such as buyer, system administrator, system operator, security administrator, etc. The security system computers 172 protect the gaming system computer(s) 164 from both internal users (e.g., employees of the seller) and external users (e.g., potential buyers).

The security system computer 172 uses database 176 to store user authentication information. It can also be accessed by future security mechanisms implemented to provide functions such as centralized user account management, centralized subject process/object control, etc.

Firewalls 178, 180, 182, 184, and 186 can be installed and arranged in many ways. These firewalls are used to control the access of source subjects located on one network to destination objects located on another network. Within firewalls 178, 180, 182, 184, and 186 exist a set of rules. These rules delineate which subjects have access to objects. At a minimum, a source to destination connection, found in a firewall 178, 180, 182, 184, and 186 rule follows Source IP address, Source Port(s), Source Mask, Destination IP address, Destination Port(s), Destination Mask, Network Protocol, Permit or Deny, Inbound or Outbound. When data arrives at a firewall 178, 180, 182, 184, and 186 it is examined. The connection is matched against an existing firewall rule. When the match is made, the firewall 178, 180, 182, 184, and 186 allows or denies the data to proceed to the destination object.

To a buy a ticket for a game or lottery, a buyer accesses the seller's web site using a buyer unit 114. The buyer selects a gaming event (e.g., horse racing, dog racing, jai alai, keno, etc.) or a lottery game (e.g., pick three, pick four, etc.) and chooses to buy a ticket. The web site interface may provide the buyer various options, for example, via a selectable list of options from which the buyer may make selections. For example, an initial list may prompt the buyer to select from among various gaming events (e.g., keno, horse racing, dog racing and jai alai) and lottery games. Selection of one of these options takes the buyer to various sub-menus and screens. For example, the buyer may be able to select from among several different types of lottery games (e.g., pick three, pick four, etc.) and/or from among lottery games run by different agencies or organizations (provided the player meets the necessary eligibility requirements such as residency and age). Similarly, if the buyer selects the horse racing option, a sub-menu may permit the buyer to select from among a number of different horse racing types (e.g., thoroughbreds, trotters, pacers) and from among a number of different tracks at which these types of races are run.

The buyer then selects desired (predicted) outcomes appropriate for the selected game. The buyer may also enter relevant personal information, payment information, and the like as needed. The transmission and/or reception of sensitive information such as credit card information may be encrypted using known encryption techniques. Typically, the buyer selects outcomes by making (alpha) numeric selections via an input device (e.g., keyboard, mouse, touch pad, touch-sensitive screen, microphone, etc.) of the buyer unit 114. The outcome data entered by the buyer takes various forms depending on the type of ticket being purchased. In the case of a lottery or keno ticket, the outcome information entered by the buyer may include numbers. For example, in a pick-four lottery game, the buyer selects four numbers (e.g., 1234). The numbers may be buyer-selected numbers or may be selected by a process running on the buyer unit itself as described below. Alternatively, the buyer may elect to have the lottery or keno ticket machine choose the numbers. In the case of races or jai alai, the outcome data entered by the buyer may include a wager amount, a selected horse, dog, player or players, and a finishing position (e.g., win, place or show).

As mentioned above, buyer unit 114 may run a process that automatically generates outcome selections for the ticket buyer. For example, the process may generate outcome selections such as lottery or keno numbers based at least in part on personal information of the buyer (e.g., birthday, street address, children's birthdays, etc.) stored in a memory to which the buyer unit has access. In another implementation, the process may generate outcome selections based at least in part on parameters sensed or sampled by buyer unit 114. For example, lottery or keno numbers may be based on the current date or the current time. Alternatively, the outcome selections may be based on information that buyer unit 114 receives from data sources (not shown) such as the number of runs scored by the user's favorite baseball team, stock market indices, etc.

The buyer also executes a custodial agreement that sets forth the relationship between the buyer, seller and/or custodian. The executed agreement is electronically communicated to seller and custodian units 112, 116 and may be stored and/or printed out by the buyer unit 114. Preferably, each of the parties to the executed agreement maintains its own electronic and/or printed-out record of the executed agreement. Seller unit 112 confirms a buyer's compliance to gaming or lottery agency rules and regulations. For example, some games may require the player to be a resident of certain states, be of a certain age, etc. This confirmation may take the form of requiring the buyer to acknowledge his/her/their residency, age, etc. on a screen of the seller's web site. Preferably, confirmation of this compliance is required before the ticket purchase is finalized.

The processing of payment information is accomplished by communicating with third party payment vendor/servicer unit 120. Third party payment vendor/servicer unit 120 includes a transaction vendor 165 and a merchant account 167 associated with a bank account(s) 169.

The seller unit 112 also includes a gaming/lottery terminal 180 and a ticket printer 186. The gaming/lottery terminal 180 communicates with a gaming/lottery system computer 182 of the gaming or lottery agency unit 118 in order to print out tickets at ticket printer 186. A gaming/lottery system database 184 of the gaming or lottery agency unit 118 stores, for example, data about the tickets generated by gaming/lottery terminal 180 and other gaming/lottery terminals connected thereto. Typically, the gaming/lottery system computer 182 is physically located at a site chosen by the gaming/lottery agency (or at a third party vendor with which the agency has contracted) that is remote from the gaming/lottery terminal 180. Seller unit 112 communicates with gaming or lottery agency unit 118 through the on line gaming/lottery terminal 180 and the buyer's outcome selections are transmitted to the terminal 180. Ticket printer 186, which is connected to the terminal 180, prints out the physical bearer ticket. Although ticket printer 186 is shown in FIG. 2 as being physically separate from terminal 180, these two components may be provided as a unitary component.

The seller and custodian units are preferably located at the same facility and may be the subject of a contractual agreement between the seller and custodian. Locating the seller and custodian units at different, remotely located facilities requires additional logistics to effect the transfer of the printed tickets from the facility at which the seller unit is located to the facility at which the custodian unit is located. While such an arrangement may be utilized, it is likely to more costly than locating the seller and custodian units at the same facility. In the FIG. 2 example embodiment, the seller and custodian are different entities and the custodian is introduced to avoid a conflict of interest between the seller and buyer. Thus, while the seller sells the ticket to the buyer, the custodian holds custody of the ticket printed as a result of the sale on behalf of the buyer.

The gaming or lottery agency unit 118 transmits to the seller unit 112 (and, if a communication path is available, to custodian unit 116) tracking data associated with each of the printed tickets which includes, but is not limited to, the unique serial codes of the ticket, a seller identifier identifying the seller of the tickets, a terminal identifier identifying the terminal from which the tickets were printed and any other data determined by the gaming or lottery agency to be relevant for identifying legal claims to winning prizes or for tracking purposes. If a communication path between the gaming or lottery agency unit 118 and the custodian unit 116 is not available, the seller unit 112 may transmit the tracking data to the custodian unit. In addition, the seller unit 112 transmits relevant ticket purchase data (e.g., buyer name, contact information, etc.) to the custodian unit 116.

The printed tickets are physically and systematically transferred to a reader/sorter 190 of the custodian unit 116 where the tickets are imaged. The tickets are then stored at a secured location 192 (e.g., a vault) at the custodian's facilities. The ticket printer 186 may be adapted for physical connection to the input of the reader/sorter 190 or the printed tickets may be manually transferred from the ticket printer 186 to the reader/sorter 190. A process executed by the custodian system computer 193 of the custodian unit 116 performs a systematic file-to-file verification to confirm and verify that the ticket details from the scanned tickets (e.g., tracking data printed on the tickets) are consistent with the information received from the seller unit 112 and/or gaming or lottery agency unit 118. The custodian unit 116 then transmits a confirmation to buyer unit 114. This confirmation may include an image of the printed ticket held in custody by the custodian. All ticket images and related data (e.g., corresponding unique serial code and any other data or code relevant to tracking the ticket printed to fulfill the buyer's valid purchase order) are stored in the database 194 of the custodian unit 116 and are also transmitted to the seller unit 112 for storage in the database 168. The custodian unit 116 processes the printed tickets further by bundling, bundle coding and safekeeping in coded cells at the secured location 192 at the custodian's facility. The bundling, bundle coding and transfer to a secure location are preferably automated processes, but, for example, the transfer to a secure location may be performed manually. The bundle-code and coded cells are all recorded in the database 194 of the custodian unit 116 and are transmitted to the seller unit 112 for storage in the database 168.

After the final determination of the outcome (results) of the gaming event or lottery game, the gaming or lottery agency unit 118 transmits to seller unit 112 the winning permutations, the monetary prizes/awards and the unique serial codes of each winning ticket associated with the seller's terminal identifiers. If a communication path is available between gaming or lottery agency unit 118 and custodian unit 116, the winning permutations, etc. are also transmitted to the custodian unit 116 by gaming or lottery agency unit 118. Otherwise, the winning permutations, etc. are transmitted to the custodian unit 116 by seller unit 112. The seller unit 112 and custodian unit 116 flag all winning tickets and the custodian unit 116 provides a notification (e.g., via e-mail) to the buyers of the winning tickets. The seller, as an authorized sales agent redeems all winning tickets with prizes less than $600 as part of its normal operation. Credit of such monetary prizes to the buyer is through the same method as with buyer's payment, but in the form of credit through the third party payment vendor/servicer. For example, the monetary prize may be credited to the credit card account used to purchase the ticket. For prizes of $600 or more, the notification from the custodian unit 116 instructs the buyers to claim the winning ticket at a location designated by the custodian (e.g., the custodian's facility) so that it may be processed according to the rules and regulations as promulgated by the gaming or lottery agency.

Thus, the system of FIG. 2 provides a method which facilitates gaming (including, but not limited to, wagers on the outcomes of horse races, dog races, jai alai or any other sporting event, games or events of chance or permutations; and governmental sponsored or authorized lottery sales transactions) over the Internet between game player(s) ("buyers"), and an authorized/designated sales agent ("seller") of a gaming authority/agency ("gaming agency"). Gaming agency refers to any organization(s) sanctioned by a governmental body for the operation, administration of gaming activities including horse racing, dog racing, jai alai or any sporting event, games or events of chance or permutations, including any governmental sponsored or authorized lottery agency ("lottery agency"), when in each case a physical ticket is produced. The ticket printed by the on line terminals linked to the gaming or lottery agency is an unregistered ticket and is in bearer form. The ticket is the primary claim mechanism that is recognized by the gaming or lottery agency.

The buyers use devices such as personal computers, terminals, PDAs or any other type of communication device connected to a wired or wireless communication path such as, but not limited to, phone line, DSL, T1, or cable and which may include a communication service provider such as an Internet Service Provider ("ISP"). For redundancy reasons, the seller unit 112 can receive data from two or more ISPs. The seller's ISP(s) have in place mechanisms that compensate for spikes in the number of transactions performed by the buyers during high volume periods.

The buyer inputs all relevant data at the seller's website (in order to initiate a purchase order) including but not limited to: buyer's name, address, date of birth, tax identification number, payment data (e.g., credit card/debit card/e-payment), e-mail address, representation of compliance to all local laws, the game or lottery tickets the buyer desires to play and purchase, the selection of the numbers and/or outcomes of the gaming or lottery drawing, and the number of plays. All such information is transmitted to the seller unit 112.

The seller unit 112 includes security that segregates the web servers from the seller's legacy systems, gaming system computer(s) (which contain business logic) and Intranet. The web servers are accessed from the Internet via a computer load balancer and access to the seller's game system computer(s) from the web servers is via internal firewalls. The security is used to authenticate users before their signals are allowed to access the seller's legacy systems, gaming system computers and Intranet. The security may be provided by middleware that implements one or more buyer authentication mechanisms such as username/password, biometrics, physical security tokens, client-side certificates, etc. The signals sent from the buyer unit to the seller unit are encrypted and cyclical redundancy checked for lost bits. This ensures security and integrity of the signal, respectively, while it is being transmitted through the Internet. In addition, an authentication process is used to validate the identity of the seller unit to the buyer unit.

The buyer desires and initiates a purchase transaction (the "purchase order"). The buyer can pick the number sequence or permutation that they wish to purchase on screens that may, for example, substantially replicate, in both appearance and function, the game cards of the gaming or lottery agency. The buyer enters and transmits the monetary value of the transaction, which includes the actual cost of the ticket(s) as required by the gaming and/or lottery agency and a per-ticket processing fee. All relevant data inputted by the buyer into the seller's legacy systems, gaming systems and/or Intranet is stored. Furthermore, the seller performs all screening criteria as specified by the gaming or lottery agency including age and residency as statutorily required. The failure of the buyer to meet statutory requirements results in a message to the buyer indicating such failure and the buyer will be directed to either cure such failure or be directed to a gaming or lottery agency website for their rules and regulations, respectively.

The seller unit relays payment information (credit card numbers, credit card authentication code and credit card expiration date or digital check number, check routing number and checking account number) from the buyer to a third party payment vendor/servicer (e.g., Verisign, Baltimore, etc.) for the assessment of a valid and good payment. Upon the successful acknowledgement of payment by the buyer, a third party electronic merchant account vendor will arrange for monetary debit from the buyer's account and credit to the seller's account. A successful monetary credit to the seller's account is classified by the seller as a valid purchase order. An unsuccessful monetary credit to the seller's account is classified by the seller as a non-valid purchase order. In the event of designation by the seller of a valid purchase order, the details of the (alpha) numerical permutation of the game outcome(s) as selected by the buyer are transmitted to the on line terminal 180. Upon the successful transfer of the data to the on line terminal 180, actual tickets are printed by the on line terminal. In the event of a non-valid purchase order, the buyer will be informed of the same, and remedies (e.g., a request to confirm the entered information, a request to enter different payment information, etc.) will be presented to the buyer to facilitate a corrected transaction.

Tracking data associated with each of the tickets is transmitted to the seller unit 112 and/or custodian unit 116. The tracking data may include the unique serial codes of each ticket, seller identifiers identifying the ticket sellers and terminal identifiers identifying the terminals that printed the tickets and any other data or code as determined by the gaming or lottery agency and/or by the custodian/safekeeper to be relevant for identification of legal claim to winning prizes or for tracking purposes. The tickets produced from the on line terminal 180 are physically transferred to a reader/sorter 190 where the tickets are imaged and the images are stored at the custodian unit's database 194. The images are also transmitted to the seller unit 112 for storage in the seller unit's database 168, along with any corresponding unique serial code or any other data or code relevant to tracking the ticket to the buyer's valid purchase order. The seller unit 112 and custodian unit 116 electronically compare, reconcile and confirm relevant ticket data with valid a purchase order. The tickets are bundled, bundle coded and safe-kept at coded cells at the custodian's facility. The unique serial code of the ticket, the bundle-code and coded cells are all recorded at the seller unit's database 168 and the custodian unit's database 194.

The buyer enters into a legal agreement (the "custodial agreement"). The custodial agreement is executed in any of the following forms prior to completing a purchase order: (a) amongst the buyer, the seller and the custodian, (b) between the buyer and the custodian, and/or (c) between the seller and the custodian. The buyer has the option to agree to the terms and conditions of the custodial agreement presented on a display screen of the buyer unit. Upon the buyer's agreement to the custodial agreement, the buyer is prompted to either proceed with input of additional data, including additional game plays, or transmitting the purchase order request to the seller unit for processing. In the event the buyer fails to execute the custodial agreement, the buyer is prompted with a notice that agreement to and execution of the custodial agreement are required for further processing of the purchase order. At this juncture, the buyer has the option to execute the custodial agreement or to be directed elsewhere on the website or to another web site.

Figure 3A:
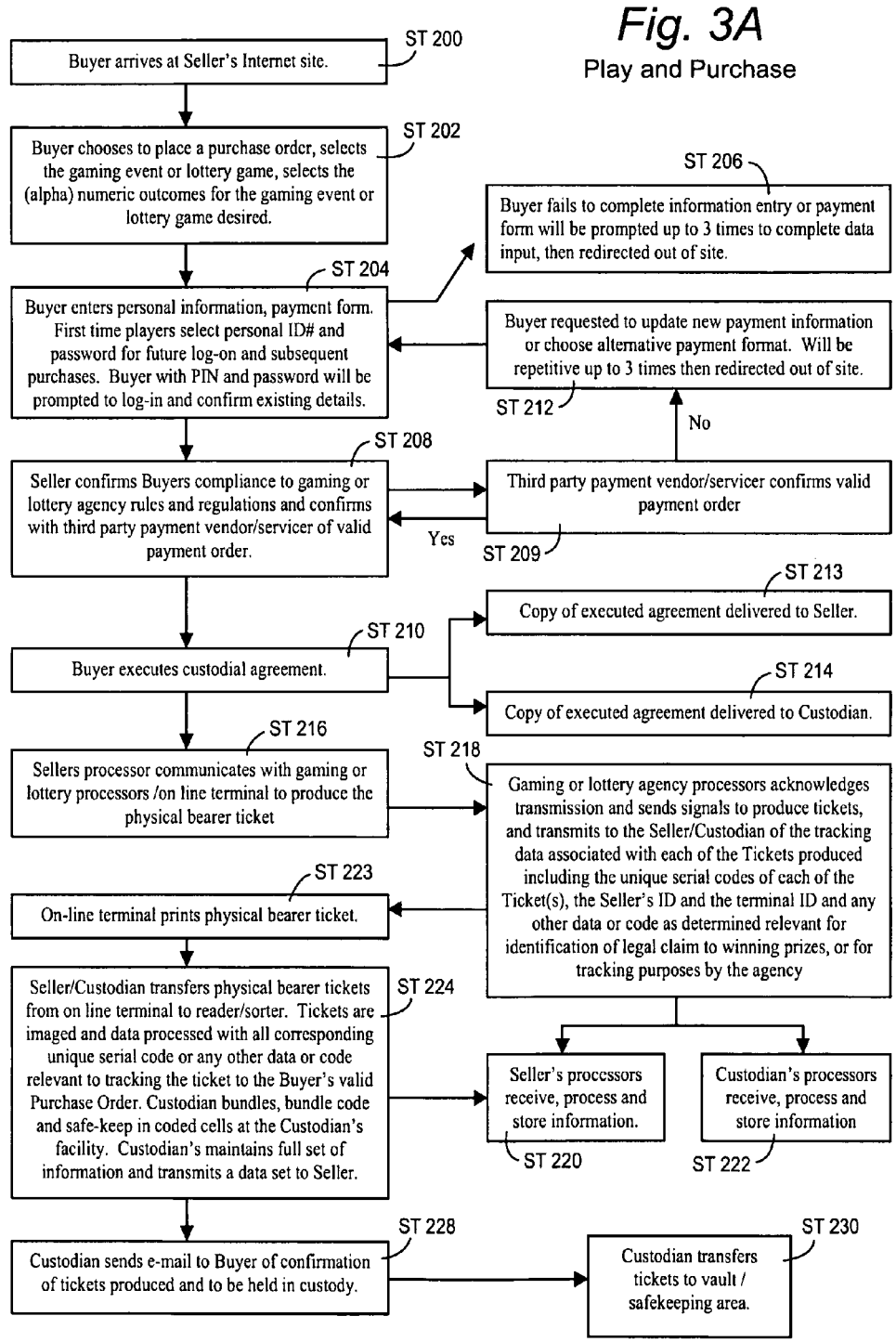

FIG. 3A is a flow chart representing a "play and purchase" process carried out in the system of FIG. 2. The buyer arrives at seller's web site (ST 200) and selects the desired gaming event or lottery game and proceeds to select outcomes for the selected gaming event or lottery game (e.g., by completing an (alpha) numeric game card) (ST 202). After selecting the outcomes of the selected gaming event or lottery game, the buyer is prompted to and proceeds to enter relevant personal information and a payment method (ST 204). First time players are prompted at this step to select a personal identifier and password for future log-ins and subsequent purchases. A return buyer is prompted to log-in using his/her personal identifier (PIN) and a password and to confirm the accuracy of the previously entered personal information. If the player fails to complete entry of the required personal or payment information, the player is prompted up to a predetermined number of times (e.g., three times) to complete the data entry (ST 206). If the player fails to complete data entry, he/she is directed out of the web site. The buyer's compliance with the relevant gaming or lottery agency rules and regulations is confirmed (e.g., by prompting the buyer to enter residence information, age information, etc.) and the payment information is processed (ST 208). If the third party vendor/servicer confirms the payment information (ST 209), the process proceeds to ST 210. If the payment information is not confirmed, the player is prompted to update his/her payment information or to choose an alternative payment form (ST 212). Failure to provide the requested update or failure to choose an alternative payment form results in the player being directed out of the site.

At ST 210, a custodial agreement is presented to the buyer for review and execution. Execution of this agreement is mandatory; otherwise the buyer is prompted to reconsider or is directed elsewhere (e.g., to another web site or to another portion of the seller's web site). If the buyer executes the custodial agreement, a copy of the executed agreement is delivered to seller unit 112 (ST 213) and stored in database 168 thereof and to custodian unit 116 (ST 214) and stored in database 194 thereof. If desired, a copy of the executed agreement may be printed out and/or stored at the buyer unit.

Seller unit 112 then communicates with the gaming or lottery agency unit 118 and transmits the details of the buyer's game or lottery output selection(s) so that the physical bearer ticket may be produced (ST 216) by the seller unit's on-line terminal. The gaming or lottery agency unit 118 acknowledges transmission and then sends signals to produce the physical bearer ticket at the terminal printer (ST 218). The gaming or lottery agency unit 118 transmits to the seller unit 112 and custodian unit 116 the tracking data associated with each ticket printed. As noted above, if the gaming/lottery agency permits only a communication path to the seller unit 112, then the seller unit relays the tracking data to the custodian unit 116. The tracking data includes, but is not limited to, the unique serial codes of the tickets, seller identifiers identifying the sellers of the tickets and terminal identifiers identifying the terminals from which the tickets are printed. Any other data determined by the gaming or lottery agency to be relevant for identifying and/or verifying legal claims to winning prizes or for tracking purposes may be provided. This information is stored in database 168 of seller unit 112 (ST 220) and the database 194 of the custodian unit 116 (ST 222).

The tickets are printed (ST 223) and then transferred to a reader/sorter 190 of custodian unit 116 where the tickets are imaged and processed with its unique serial code and any other data relevant to tracking the ticket (ST 224). The custodian unit 116 further processes the tickets by bundling, bundle coding and safe-keeping the tickets in coded cells at the custodian's facility. The unique serial code of the ticket, the bundle-code and coded cells are all recorded in the database 194 of the custodian unit 116 and in the database 168 of the seller unit 112 (ST 220).

The custodian unit 116 then transmits to the buyer a confirmation with an accompanying image of the printed ticket(s) (ST 228) and the custodian transfers the physical printed ticket(s) to secure location 192 (ST 230).

FIG. 3B is a flow chart illustrating the "redemption" process carried out in the system of FIG. 2. After the final determination of the outcome(s) of the gaming event or lottery drawing, the gaming or lottery agency unit 118 transmits to seller unit 112 and custodian unit 116 the winning permutations, the monetary prizes/awards and the unique serial codes of each winning ticket associated with the seller's terminal identifiers (ST 232). As noted above, if the gaming/lottery agency permits only a communication path to the seller unit 112, then the seller unit relays the winning permutations, etc. to the custodian unit 116. Seller unit 112 and custodian unit 116 each flags all winning tickets with monetary prizes (ST 234 and ST 236). Custodian unit 116 divides the wining tickets into two groups: a first group with a prize of less than $600 and a second group with a prize $600 or higher. Custodian unit 116 and seller unit 112 confirm with each other all the winning tickets with monetary prizes (ST 238) by systematically matching their respective electronic records regarding the tickets. The custodian physically and systematically retrieves winning tickets from its coded cells and bundles as identified using the relevant data. Custodian unit 116 notifies a winning buyer of his/her winnings though an e-mail communication.

The custodian presents on behalf of the buyer winning tickets for less than $600 to the seller for redemption (ST 240). The seller, as an authorized sales agent, redeems all winning tickets with prizes less than $600 as part of its normal process (ST 242). The seller transmits to the third party payment vendor/servicer instructions to credit the amount of the buyer's winnings to the buyer's credit card, bank account, etc.) (ST 244) and then the third party payment vendor/servicer credits the buyer's account (ST 246).

The custodian holds in custody on behalf of the buyer winning tickets for prizes of $600 or more (ST 248). The e-mail notification to the buyer will include instructions as to where the buyer may claim, in person, the winning ticket so that it may be processed according to the rules and regulations promulgated by the gaming or lottery agency. The buyer then claims the ticket(s) and claims the prize (ST 250).

Figure 4:
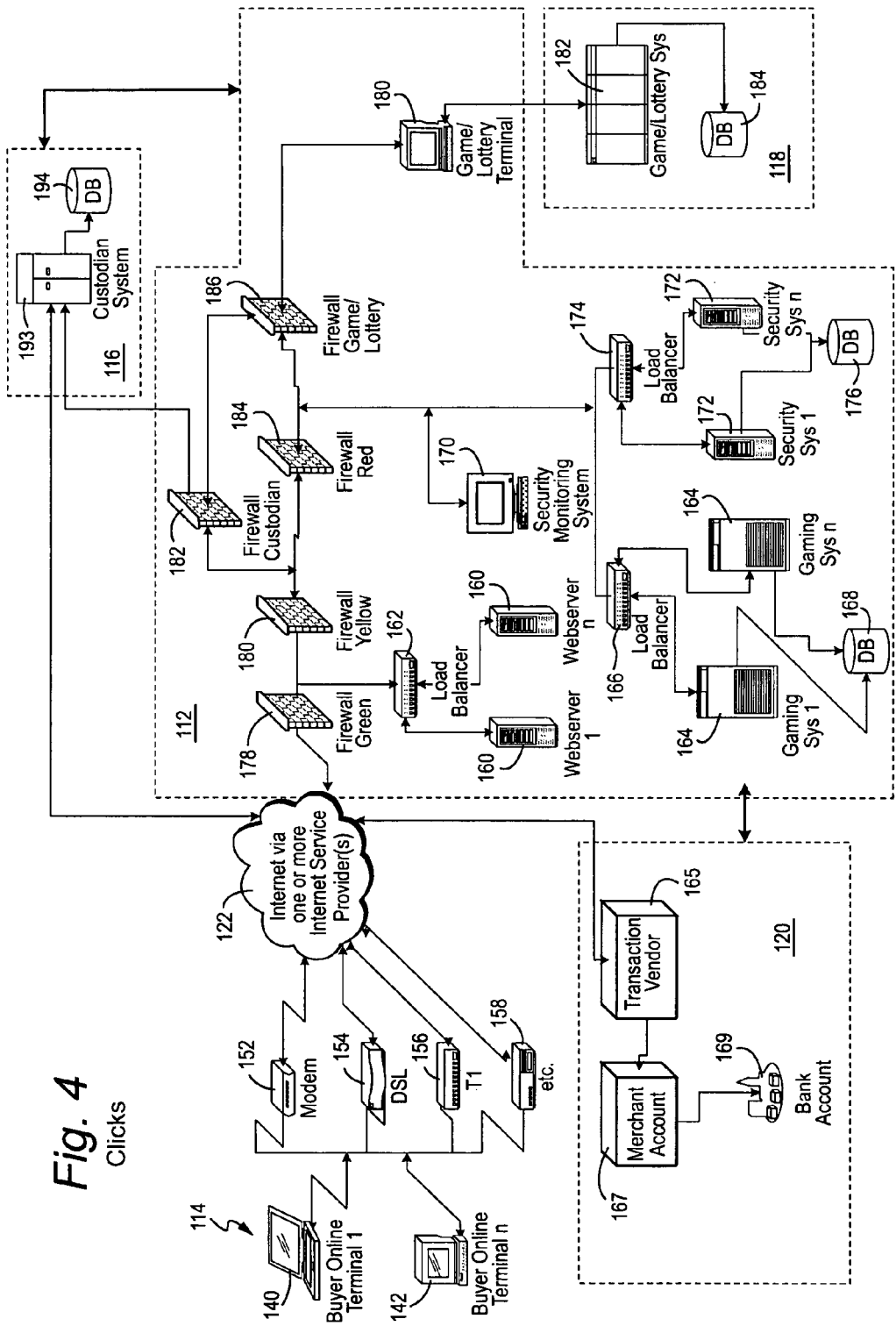
FIG. 4 is a block diagram of the "clicks" framework.

FIG. 4 is a block diagram illustrating an example of the "clicks" (first) framework. The "clicks" framework encompasses an open-ended architecture for a plurality of buyers operating on the Internet to purchase gaming or lottery tickets and to receive confirmation of such purchases; their Internet Service Provider; and a designated sales agent system which includes web servers, firewalls, security, authentication and authorization systems, and host machines structured in a distributed computing environment. The "clicks" framework encompasses all of the attributes discussed and illustrated in FIG. 2 except for two aspects. First, the actual generation or production, processing and safekeeping of the physical bearer tickets or "bricks" which will be described in FIG. 5; and second, the legal contractual arrangement between the buyer, seller and custodian or "sticks" which will be described in FIG. 6.

Figure 5A:
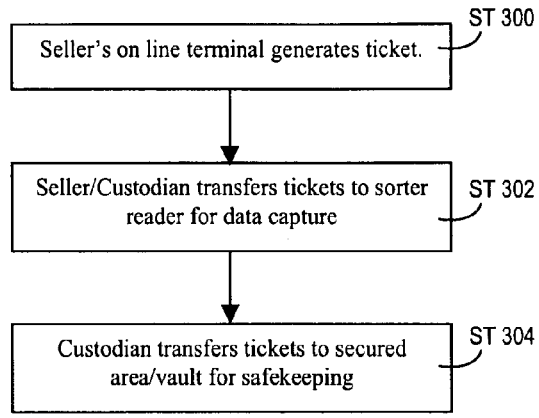
FIGS. 5A and 5B are block diagrams of the "bricks" framework.
Figure 5B:
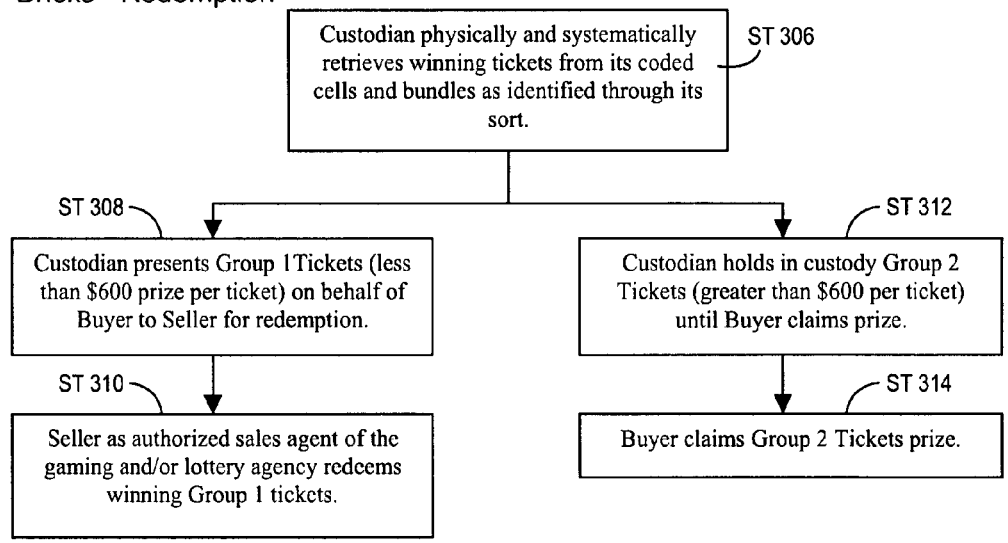

FIGS. 5A and 5B illustrate the "bricks" framework (i.e., physical processing mechanism). The "bricks" portion of the process has two components as illustrated in FIGS. 5A and 5B, respectively: the "play and purchase" component and the "redemption" component. In the "play and purchase" component, the seller's on-line gaming or lottery terminal and printer generates and prints the actual physical/bearer ticket (ST 300). The physical bearer tickets are physically and mechanically transferred to a reader/sorter where the tickets are imaged, data processed and recorded (ST 302). The custodian processes the tickets further by bundling, bundle coding and transporting the tickets to coded cells at its secured facilities (e.g., vault) for safekeeping (ST 304).

With respect to the "redemption" component, the custodian physically and systematically retrieves winning tickets from its coded cells and bundles as identified through its identification process (ST 306). The custodian presents winning physical/bearer tickets with value of less than $600 per game to the seller for monetary redemption on behalf of the buyer (ST 308). The seller, as an authorized sales agent redeems and collects all winning tickets with prizes less than $600 as part of its normal process (ST 310). The custodian holds in custody for the buyer tickets for prizes $600 or greater until the buyer claims the ticket (ST 312). The buyer then claims the ticket (ST 314).

Figure 6:
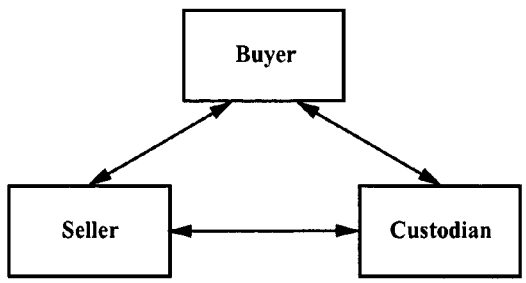
FIG. 6 is a block diagram of the "sticks" framework.

FIG. 6 is an illustration of the "sticks" framework. This framework involves execution by the buyer, seller, and custodian of a roles and responsibility agreement. "Sticks" refers to a legal agreement executed on-line that delineates a legal and contractual engagement of an independent third party, the custodian, thereby clearly segregating the interest of the buyer and seller. The agreement essentially states that the buyer agrees to buy from the seller the gaming/lottery tickets, and agrees to have the custodian hold in custody the tickets on the buyer's behalf. Further in the agreement, the seller agrees to sell to the buyer the tickets and will deliver such tickets to the custodian. The seller also agrees to redeem all prizes below certain thresholds for credit back to the buyer's credit account. The custodian agrees to receive the tickets from the seller, and will hold the tickets in custody for the benefit of the buyer.

Figure 7:
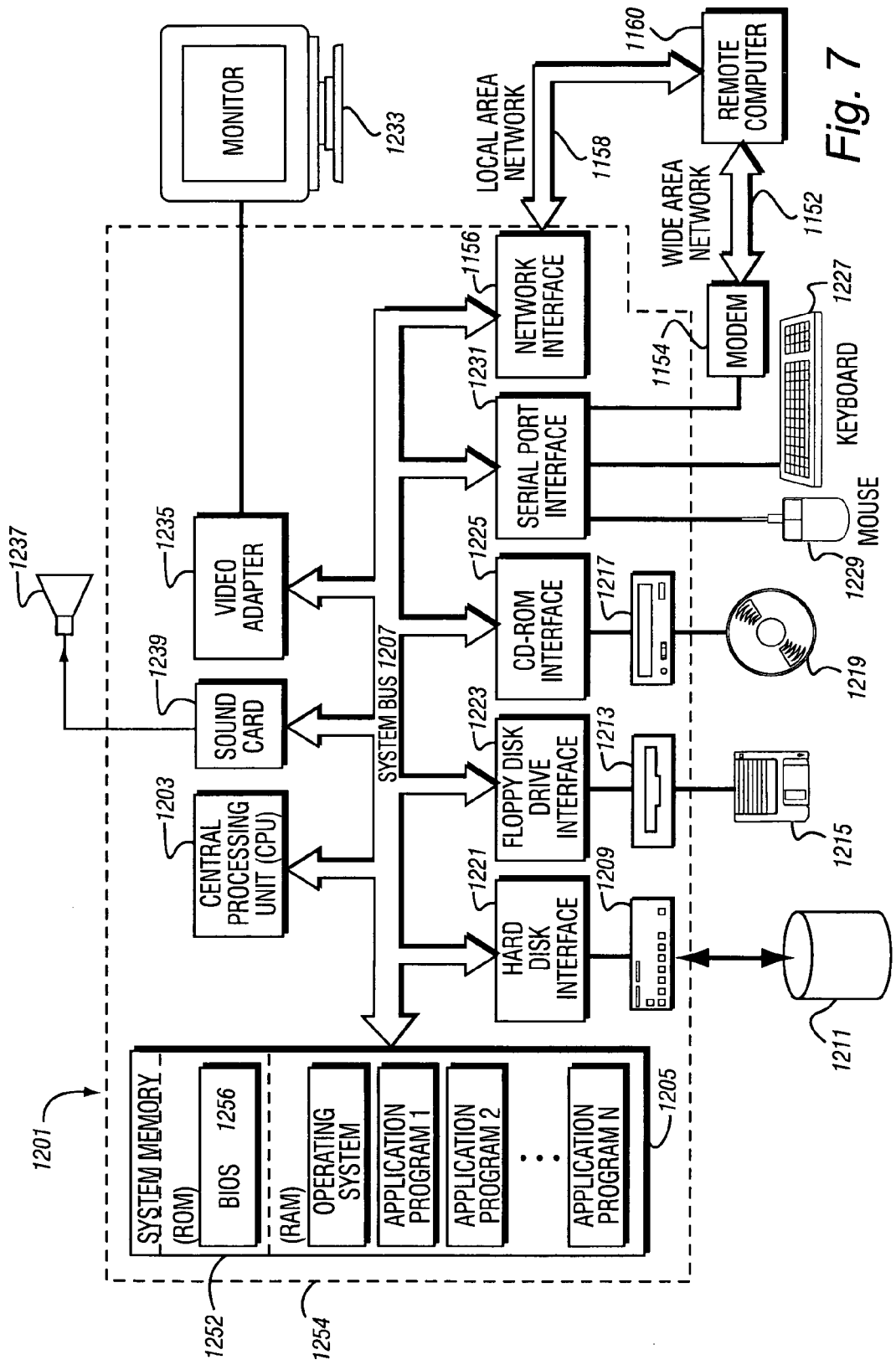
FIG. 7 is a generalized block diagram of an example computer system.

FIG. 7 is a generalized block diagram of a computer system 1201 that may be used, for example, as part of the buyer unit or seller unit. It will be evident that this computer system is provided by way of example only and that other types of computer systems such as work stations and web servers may be used. System 1201 includes a processing unit 1203 and a system memory 1205. A system bus 1207 couples various system components including system memory 1205 to processing unit 1203. System bus 1207 may be any of several types of bus structures including a memory bus or memory controller, a peripheral bus, and a local bus using any of a variety of bus architectures. System memory 1207 includes read only memory (ROM) 1252 and random access memory (RAM) 1254. A basic input/output system (BIOS) 1256, containing the basic routines that help to transfer information between elements within computer system 1201, such as during start-up, is stored in the ROM 1252. System 1201 further includes various drives and associated computer-readable media. A hard disk drive 1209 reads from and writes to a (typically fixed) magnetic hard disk 1211. An additional (possible optional) magnetic disk drive 1213 reads from and writes to a removable "floppy" or other magnetic disk 1215. An optical disk drive 1217 reads from and, in some configurations, writes to a removable optical disk 1219 such as a CD ROM or other optical media. Hard disk drive 1209 and optical disk drive 1217 are connected to system bus 1207 by a hard disk drive interface 1221 and an optical drive interface 1225, respectively. The drives and their associated computer-readable media provide nonvolatile storage of computer-readable instructions, data structures, program units, game programs and other data for computer system 1201. In other configurations, other types of computer-readable media that can store data that is accessible by a computer (e.g., magnetic cassettes, flash memory cards, digital video disks, Bernoulli cartridges, random access memories (RAMs), read only memories (ROMs) and the like) may also be used.

A number of program units may be stored on the hard disk 1211, removable magnetic disk 1215, optical disk 1219 and/or the ROM 1252 and/or the RAM 1254 of system memory 1205. Such program units may include an operating system providing graphics and sound APIs, one or more application programs, other program units, and program data. A user may enter commands and information into personal computer system 1201 through input devices such as a keyboard 1227, pointing device 1229, microphones, joysticks, game controllers, satellite dishes, scanners, or the like. These and other input devices can be connected to processing unit 1203 through a serial port interface 1231 that is coupled to system bus 1207, but may be connected by other interfaces, such as a parallel port, game port Fire wire bus or a universal serial bus (USB). A monitor 1233 or other type of display device is also connected to system bus 1207 via an interface, such as a video adapter 1235.

System 1201 may also include a modem 1154 or other network interface means for establishing communications over a network 1152 such as the Internet. Modem 1154, which may be internal or external, is connected to system bus 123 via serial port interface 1231. A network interface 1156 may also be provided for allowing system 1201 to communicate with a remote computing device 1150 (e.g., another system 1201) via a local area network 1158 (or such communication may be via wide area network 1152 or other communications path such as dial-up or other communications means). System 1201 will typically include other peripheral output devices, such as printers and other standard peripheral devices.

A set of stereo loudspeakers 1237 is also connected to system bus 1207 via a sound generating interface such as a conventional "sound card" providing hardware and embedded software support for generating high quality stereophonic sound based on sound commands provided by bus 1207.

The example system and method described herein provide a process for facilitating a game player's perfection of their security interest to physical/bearer game tickets purchased and issued from an authorized sales agent of a gaming and/or lottery agency when the initiation of the game and purchase of the game tickets are transacted over the Internet. The system and method also provide a process for facilitating governments and their agencies to sell gaming or lottery tickets via the Internet without changing their current bearer ticket process, without a major systems rewrite, and without increasing their fraud, legal and logistical exposure.

The above-described example method and system facilitate the perfection of a security interest to the physical bearer ticket processed and housed at a secure location (e.g., a vault) of the custodian and facilitate the claims administration of winning gaming or lottery tickets by the seller and custodian. The actual ticket is the primary claim mechanism that is recognized by the gaming or lottery agency. The tickets are produced at the facilities of the seller and the custodian takes possession of the tickets, which are physically and mechanically transferred to its processes for data capture and other processes including safekeeping at the secure location.

The gaming or lottery agency transmits to the seller unit and/or the custodian unit the results and outcomes of the gaming or lottery event, the permutations of the (alpha) numeric winning numbers that have a monetary prize associated with it, as well as information identifying the winning tickets (e.g., the unique serial codes, the seller's identifier and the terminal identifier and any other data or code as determined relevant for identification of legal claim to winning prizes that the gaming or lottery agency recognizes). The seller unit and/or the custodian unit compare data transmitted by gaming or lottery agency with the seller and/or custodian's database of ticket information produced by the valid purchase order process to identify the winning tickets held by the custodian and the buyer of that ticket. The custodian retrieves all tickets with winning prizes less than $600 and presents such tickets to the seller, for credit of such winning prizes to the buyer through the same method as with buyer's payment, but in the form of good credit through the third party payment vendor/servicer. The seller redeems such winning tickets as part of the seller's normal operations as sales agent for the gaming or lottery agency. The $600 threshold is set by governmental regulatory bodies and may be unilaterally changed by them. The above-described process is readily adapted to any threshold promulgated by such regulatory agencies. The custodian identifies all tickets and their respective buyers with winning prizes of $600 or more and sends e-mail notifications to these buyers to claim, in person, the winning ticket so that it may be processed according to the rules and regulations as promulgated by the gaming or lottery agency.

While particular embodiments of the present invention have been described and illustrated, it should be understood that the invention is not limited thereto since modifications may be made by persons skilled in the art. The present application contemplates any and all modifications that fall within the spirit and scope of the underlying invention discloses and claimed herein.

We claim:

1. A method for buying tickets for games or lotteries, comprising:
   receiving, using a communication circuit of a computer of a seller, predicted game or lottery outcome data communicated from a buyer over a communication path;
   generating, using a printer coupled to the seller computer, a printed bearer ticket based on the received outcome data;
   transferring the printed bearer ticket from the seller to a custodian that holds the printed bearer ticket on behalf of the buyer, the custodian being a separate legal entity from the seller;
   transmitting, using a communication circuit of a computer of the custodian, ticket-related data relating to the printed bearer ticket to the buyer over the communication path; and
   notifying, using the communication circuit of the custodian computer, the buyer of a winning game or lottery outcome for the printed bearer ticket.

2. The method according to claim 1, wherein the predicted game or lottery outcome data comprises lottery numbers.

3. The method according to claim 1, wherein the predicted game or lottery outcome data comprises keno numbers.

4. The method according to claim 1, wherein the predicted game or lottery outcome data comprises a winner of a race.

5. The method according to claim 1, wherein the predicted game or lottery outcome data comprises a winner of a game.

6. The method according to claim 1, further comprising:
   optically scanning, using a scanner coupled to the custodian computer, the printed ticket data to produce a ticket image, and storing, in a memory which is part of or accessible to the custodian computer, the ticket-related data, the ticket image being part of the ticket-related data.

7. The method according to claim 6, wherein the transmitted data comprises the ticket image.

8. The method according to claim 1, wherein the ticket-related data comprises a unique ticket identifier.

9. The method according to claim 1, wherein the ticket-related data comprises ticket storage location data.

* * * * *